United States Patent
Miyata et al.

(10) Patent No.: US 10,682,718 B2
(45) Date of Patent: Jun. 16, 2020

(54) METHOD FOR WELDING ZINC PLATED STEEL PLATE

(71) Applicant: Kobe Steel, Ltd., Kobe-shi (JP)

(72) Inventors: Minoru Miyata, Kanagawa (JP); Reiichi Suzuki, Kanagawa (JP)

(73) Assignee: Kobe Steel, Ltd., Kobe-shi (JP)

( * ) Notice: Subject to any disclaimer, the term of this patent is extended or adjusted under 35 U.S.C. 154(b) by 323 days.

(21) Appl. No.: 15/747,931

(22) PCT Filed: Jul. 12, 2016

(86) PCT No.: PCT/JP2016/070530
§ 371 (c)(1),
(2) Date: Jan. 26, 2018

(87) PCT Pub. No.: WO2017/018201
PCT Pub. Date: Feb. 2, 2017

(65) Prior Publication Data
US 2019/0009355 A1 Jan. 10, 2019

(30) Foreign Application Priority Data
Jul. 27, 2015 (JP) .................................. 2015-147842

(51) Int. Cl.
*B23K 9/09* (2006.01)
*B23K 9/23* (2006.01)
(Continued)

(52) U.S. Cl.
CPC ............... *B23K 9/09* (2013.01); *B23K 9/092* (2013.01); *B23K 9/1006* (2013.01); *B23K 9/16* (2013.01);
(Continued)

(58) Field of Classification Search
CPC ... B23K 9/09; B23K 9/23; B23K 9/16; B23K 9/092; B23K 9/173; B23K 9/1006;
(Continued)

(56) References Cited

U.S. PATENT DOCUMENTS 5,539,180 A * 7/1996 Mori ...................... B23K 26/12
219/121.64
7,241,970 B2 * 7/2007 Fortain .................. B23K 9/173
219/129

(Continued)

FOREIGN PATENT DOCUMENTS

JP 2009-233707 A 10/2009
JP 2013-184216 A 9/2013

OTHER PUBLICATIONS

International Search Report dated Oct. 4, 2016 in PCT/JP2016/070530 filed Jul. 12, 2016.

*Primary Examiner* — David J Walczak
(74) *Attorney, Agent, or Firm* — Oblon, McClelland, Maier & Neustadt, L.L.P.

(57) ABSTRACT

A method for welding a galvanized steel sheet includes utilizing a pulse welding of repeatedly applying a pulse peak current and a base current, setting a welding speed to 100 cm/min or less, and using a shielding gas in which 1 vol % or more and 10 vol % or less of at least either one of $CO_2$ and $O_2$ is added to Ar. The pulse peak current has a pulse peak time being in a range of 7% or more and less than 50% of one period depending on a sheet thickness of the galvanized steel sheet.

7 Claims, 4 Drawing Sheets

(51) Int. Cl.
  *B23K 9/16* (2006.01)
  *B23K 9/173* (2006.01)
  *B23K 9/10* (2006.01)
  *B23K 103/04* (2006.01)
  *B23K 101/34* (2006.01)

(52) U.S. Cl.
  CPC .............. *B23K 9/173* (2013.01); *B23K 9/23* (2013.01); *B23K 2101/34* (2018.08); *B23K 2103/04* (2018.08)

(58) Field of Classification Search
  CPC ............ B23K 2103/04; B23K 2102/34; B23K 9/093; B23K 9/095; B23K 9/162; B23K 9/164; B23K 9/1012; B23K 2103/02; B23K 2102/32
  See application file for complete search history.

(56) References Cited

U.S. PATENT DOCUMENTS

| | | | | |
|---|---|---|---|---|
| 9,776,273 B2* | 10/2017 | Fujiwara | .................. | B23K 9/09 |
| 10,052,707 B2* | 8/2018 | Henry | .................... | B23K 9/092 |
| 2015/0027995 A1 | 1/2015 | Izutani et al. | | |

* cited by examiner

METHOD FOR WELDING ZINC PLATED STEEL PLATE

TECHNICAL FIELD

The present invention relates to a welding method for use in automotive parts, etc. More specifically, it relates to a method for welding a galvanized steel sheet, which is applied to a portion where importance is placed on corrosion resistance and a galvanized steel sheet is used.

BACKGROUND ART

In general, a galvanized steel sheet with high corrosion resistance is sometimes used in suspension parts relevant to wheels that are an automotive component, or in underbody parts that are a portion facing the road surface in an automotive body. For example, in a suspension member or a suspension arm, which is an automotive suspension parts, a galvanized steel sheet is used. The galvanized steel sheet used is often subjected to welding and is coated after the welding.

In the welding of a galvanized steel sheet, zinc is vaporized due to arc heat, and zinc vapor generated here may pass through a molten metal or be partially taken in by a molten metal, resulting in blowhole formation. As the amount of blowholes generated is larger, in the welding of a galvanized steel sheet, the blowhole resistance is judged to be poorer.

Various proposals for addressing the problem of the blowhole resistance have been heretofore made. For example, Patent Document 1 describes a technique of performing while shaking the weld pool and promoting discharge of zinc vapor, by controlling the waveform of welding current, setting the carbon dioxide gas concentration of a shielding gas to be relatively high, and repeating a high pulse current term and a low pulse current term.

In addition, Patent Document 2 describes a galvanized steel sheet, in which welding is performed at a high speed by periodically repeating a term in which a rectangular wave pulse is applied, and a term in which only a base current is applied.

PRIOR ART LITERATURE

Patent Document

Patent Document 1: JP-A-2013-184216
Patent Document 2: JP-A-2009-233707

SUMMARY OF THE INVENTION

Problems that the Invention is to Solve

However, in the conventional methods for welding a galvanized steel sheet, there was the following problems.

In the welding method described in Patent Document 1, a power source capable of special waveform control is required, and the versatility is lost. In addition, an increased amount of $CO_2$ in a shielding gas gives rise to an increase in the amount of slug produced and since a slug to which a coat is difficult to be attached increases, the electrodeposition coatability deteriorates.

Furthermore, in the welding method described in Patent Document 2, a long base term compared to the sheet thickness is set and therefore, magnetic blow readily occurs. When magnetic blow occurs, an arc tends to become unstable causing generation of a blowhole defect. A portion allowing a spatter to be readily generated due to unstable arc and adhere is likely to rust, incurring degradation of the coating.

The present invention has been created in consideration of the above-described problems, and an object thereof is to provide a method for welding a galvanized steel sheet, where a general-purpose welding apparatus can be used, the amount of oxidized gas in a shielding gas can be reduced, and the electrodeposition coatability and blowhole resistance can be enhanced.

Means for Solving the Problems

In order to attain the above-described object, in the welding method of a galvanized steel sheet of the present invention, the following configuration is employed.

That is, the welding method of a galvanized steel sheet is a method for welding a galvanized steel sheet, including utilizing a pulse welding of repeatedly applying a pulse peak current and a base current, setting a welding speed to 100 cm/min or less, and using a shielding gas in which 1 vol % or more and 10 vol % or less of at least either one of $CO_2$ and $O_2$ is added to Ar, in which the pulse peak current has a pulse peak time being in a range of 7% or more and less than 50% of one period depending on a sheet thickness of the galvanized steel sheet; in a case where the sheet thickness is 0.8 mm or more and less than 1.6 mm, the pulse peak time has a lower limit value of 7% or more of the one period and the pulse peak time has an upper limit value of less than 15% of the one period; in a case where the sheet thickness is 1.6 mm or more and less than 2.3 mm, the pulse peak time has a lower limit value of 15% or more of the one period and the pulse peak time has an upper limit value of less than 30% of the one period; and in a case where the sheet thickness is 2.3 mm or more and less than 3 mm, the pulse peak time has a lower limit value of 20% or more of the one period and the pulse peak time has an upper limit value of 40% of the one period.

Following such procedure, in the welding method of a galvanized steel sheet, pulse welding is performed by setting the pulse peak time depending on the sheet thickness, and zinc vapor is expelled to escape the weld portion by arc force during the pulse peak time, as a result, the blowhole resistance is enhanced. Furthermore, the proportion of the term for intensifying the arc is optimized in one period depending on the sheet thickness, so that the blowhole resistance can be stably enhanced. In addition, the amount of slug produced in the weld portion can be reduced to a very small amount by setting the concentration of an oxidized gas such as $CO_2$ or $O_2$ to be 10% or less.

In the welding method of a galvanized steel sheet, the shielding gas is set to contain 8 mass % or less of $CO_2$ or $O_2$.

Following such procedure, in the welding method of a galvanized steel sheet, the amount of slug produced in the weld part can be more reduced.

In the welding method of a galvanized steel sheet, in a case where the sheet thickness is 0.8 mm or more and less than 1.6 mm, a welding wire diameter is set to be 0.8 mm or more and 1.2 mm or less; in a case where the sheet thickness is 1.6 mm or more and less than 2.3 mm, a welding wire diameter is set to be 1.0 mm or more and 1.4 mm or less; and in a case where the sheet thickness is 2.3 mm or more, a welding wire diameter is set to be 1.2 mm or more and 1.6 mm or less.

Following such procedure, in the welding method of a galvanized steel sheet, welding is performed while setting the welding wire diameter to a predetermined range depending on the sheet thickness so as to prioritize gap resistance in the welding for small sheet thickness and prioritize blowhole resistance in the welding for large sheet thickness.

In the welding method of a galvanized steel sheet, the welding speed of the pulse welding is set to be 100 cm/min or less, preferably 75 cm/min or less. The lower limit value of the welding speed is preferably 30 cm/min or more.

Following such procedure, in the welding method of a galvanized steel sheet, the welding speed is set to be slower than a speed at which the welding is usually performed, and gap resistance and blowhole resistance corresponding to the sheet thickness can thereby be unfailingly realized.

In the welding method of a galvanized steel sheet, a coating weight of the galvanized steel sheet welded by the pulse welding is set to be 90 g/m² or less on one surface.

Following such procedure, in the welding method of a galvanized steel sheet, the zinc coating weight in the steel sheet is reduced to prevent an increase in the amount of zinc vapor evaporated during pulse welding, and the blowhole resistance is thereby ensured.

In the welding method of a galvanized steel sheet, the welding is performed under a welding condition where Y/X satisfies 0.75≤Y/X≤1.1 (Formula 3), in which

[Math. 1]

$$X = \left(\left[\frac{[VOL\ \%\ CO_2]}{5} + 21\right]\right) \times \left(\left[\frac{[average\ current] - 60}{280}\right]\right) + 14, \quad \text{Formula 1}$$

and $$Y = [welding\ voltage]. \quad \text{Formula 2}$$

Following such procedure, in the welding method of a galvanized steel sheet, the welding condition is more restrictively limited, so that escape of zinc vapor from the weld portion can be more facilitated to prevent burning through of the weld portion due to arc while enhancing the blowhole resistance and the spatter can also be reduced.

Advantage of the Invention

In the welding method of a galvanized steel sheet according to the present invention, the pulse peak time in the pulse welding is set to a predetermined value of one period in response to the sheet thickness and therefore, zinc vapor is difficultly taken in by the weld portion, as a result, the blowhole resistance is enhanced. In addition, by setting concentration of oxidized gas to be 10% or less, the amount of slug produced in the weld portion can thereby be reduced to a very small amount, and therefore the coatability can be enhanced.

MODE FOR CARRYING OUT THE INVENTION

Figure 1:
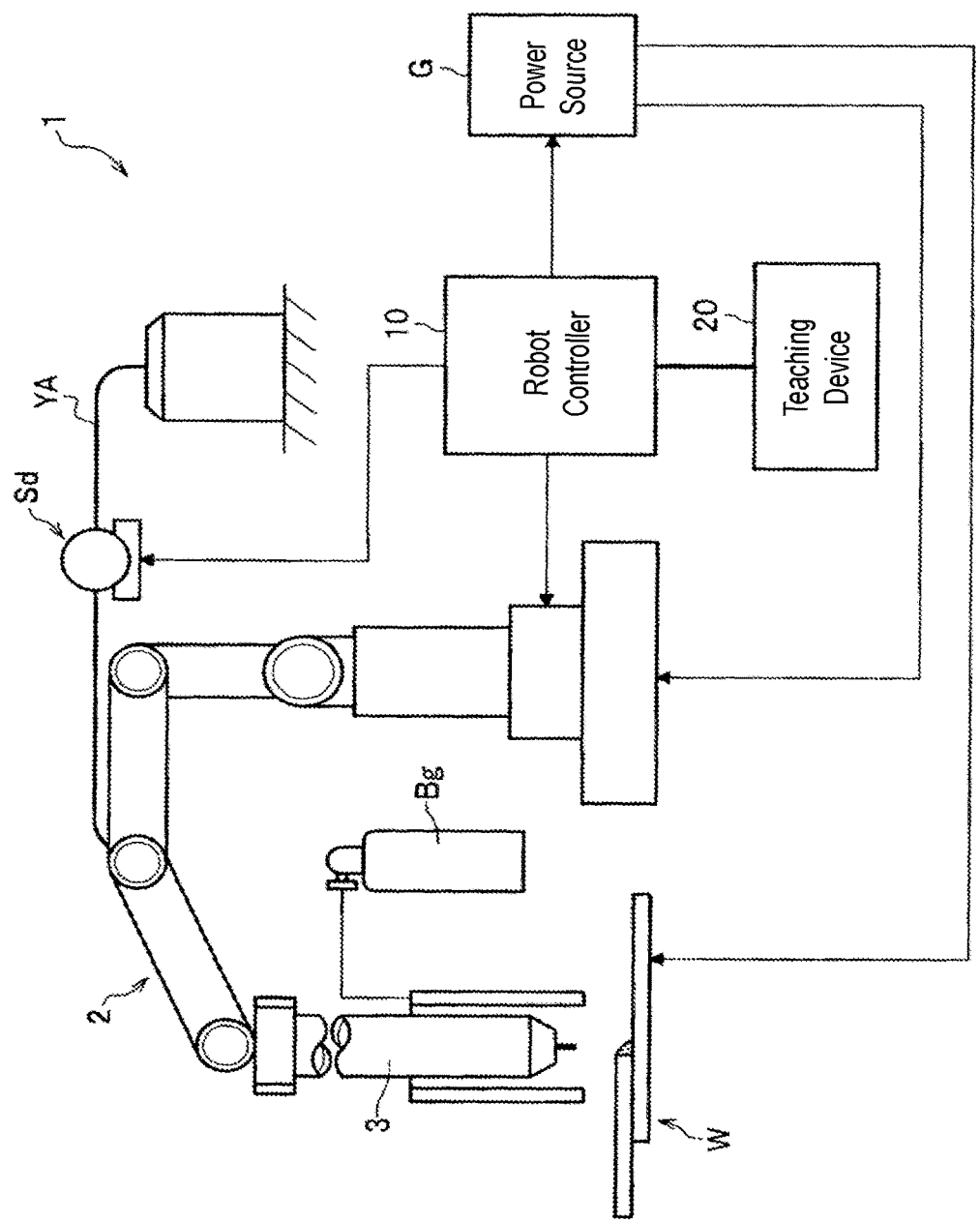
FIG. 1 is a schematic diagram schematically illustrating an entire configuration of a pulse welding apparatus used in the welding method according to the present invention.

With respect to the welding method of a galvanized steel sheet (hereinafter, referred as the welding method) according to the present invention, the procedure performed by using a pulse welding apparatus 1 is described by referring to the drawing. In the drawing, the sheet thickness and, for example, the size, shape and member-to-member distance of a welding wire, a welding torch, etc may be schematically depicted in a partially exaggerated manner for the sake of clarity.

This welding method is to perform pulse welding with use of a welding apparatus 1 by setting the pulse peak time in response to the sheet thickness of a galvanized steel sheet W and using a welding wire as well as using a shielding gas. Here, a solid wire YA is used as the welding wire, an Ar mixed gas (Ar—$CO_2$ gas, Ar—$O_2$ gas, Ar—$CO_2$—$O_2$ gas) as a shielding gas is supplied, a pulse current as a welding current is supplied to the solid wire, and an arc is thereby generated between the solid wire YA and a galvanized steel sheet W, i.e., a matrix, to perform welding.

<Galvanized Steel Sheet>

The galvanized steel sheet W as a welding target is, for example, a suspension member used as an automotive suspension parts. For this suspension member, a steel sheet formed to have a predetermined thickness and a predetermined shape and subjected to galvanization is used. As the galvanized steel sheet W used here, one having a coating weight of, for example, 90 g/m² or less is employed. The galvanized steel sheet W may be also be SGCC (hot-dip galvanized steel sheet) in conformity with JIS G 3302:2010 and have a zinc coating weight of 45 g/m², i.e., 50 g/m² or less, as long as the coating weight is 90 g/m² or less. As the galvanized steel sheet W, one having a thickness in a range of 0.8 to 2.6 mm is used. The galvanized steel sheet W is a sheet material obtained by forming a zinc plating film on a surface of a steel sheet, and the composition, thickness, etc. of the steel sheet are not particularly limited. In addition, the coating weight on the matrix surface of the galvanized steel sheet W is also not particularly limited as long as it is 90 g/m² or less. If the coating weight of the galvanized steel sheet W exceeds 90 g/m², discharge of zinc vapor during welding cannot be fully promoted, making it difficult to reduce blowholes in the weld portion. The sheet thickness of the galvanized steel sheet W is assumed to be used in a range of from 0.8 to 4.0 mm.

This welding method is described by using a welding apparatus 1 illustrated in FIG. 1. The welding apparatus 1 includes, for example, a multi jointed robot arm 2, a robot controller 10 for controlling movement of the robot arm 2, a teaching device 20 as an operating device, an advancing mechanism Sd for advancing a welding wire (e.g., solid wire, flux-cored wire, metal-cored wire) YA, and a welding power source G for performing welding work. This welding apparatus 1 is one example, and as long as the apparatus is configured to be connectable to a connection hose from a gas cylinder Bg for supplying a shielding gas and can perform general pulse welding, the configuration thereof is not particularly limited. For example, in the welding apparatus 1 illustrated in FIG. 1, the advancing mechanism Sd is configured as a separate body from the robot arm 2 but may be configured to be integrally provided at a predetermined position of the robot arm 2. In the welding apparatus 1, a welding wire YA is advanced to a welding torch 3 attached to the distal end of the robot arm 2, and welding is performed under the conditions of a pulse peak current, a base current, etc. supplied from the welding power source G and a shielding gas, etc. supplied, for example, from the gas cylinder Bg.

<Pulse Peak Time>

The pulse peak time is set based on the sheet thickness of the galvanized steel sheet W welded. The pulse peak time is set to a predetermined range based on the sheet thickness of the galvanized steel sheet W, and the data set in the predetermined range is set in the robot controller. In this welding method, when the sheet thickness of the galvanized steel sheet W is in the range of from 0.8 to 2.6 mm, the pulse peak time is set to the range of 7% or more and less than 50% of one period, preferably 7% or more and 40% or less of one period. In the present invention, the ratio of the pulse peak time to one period is sometimes simply referred to as "peak ratio".

Figure 2:
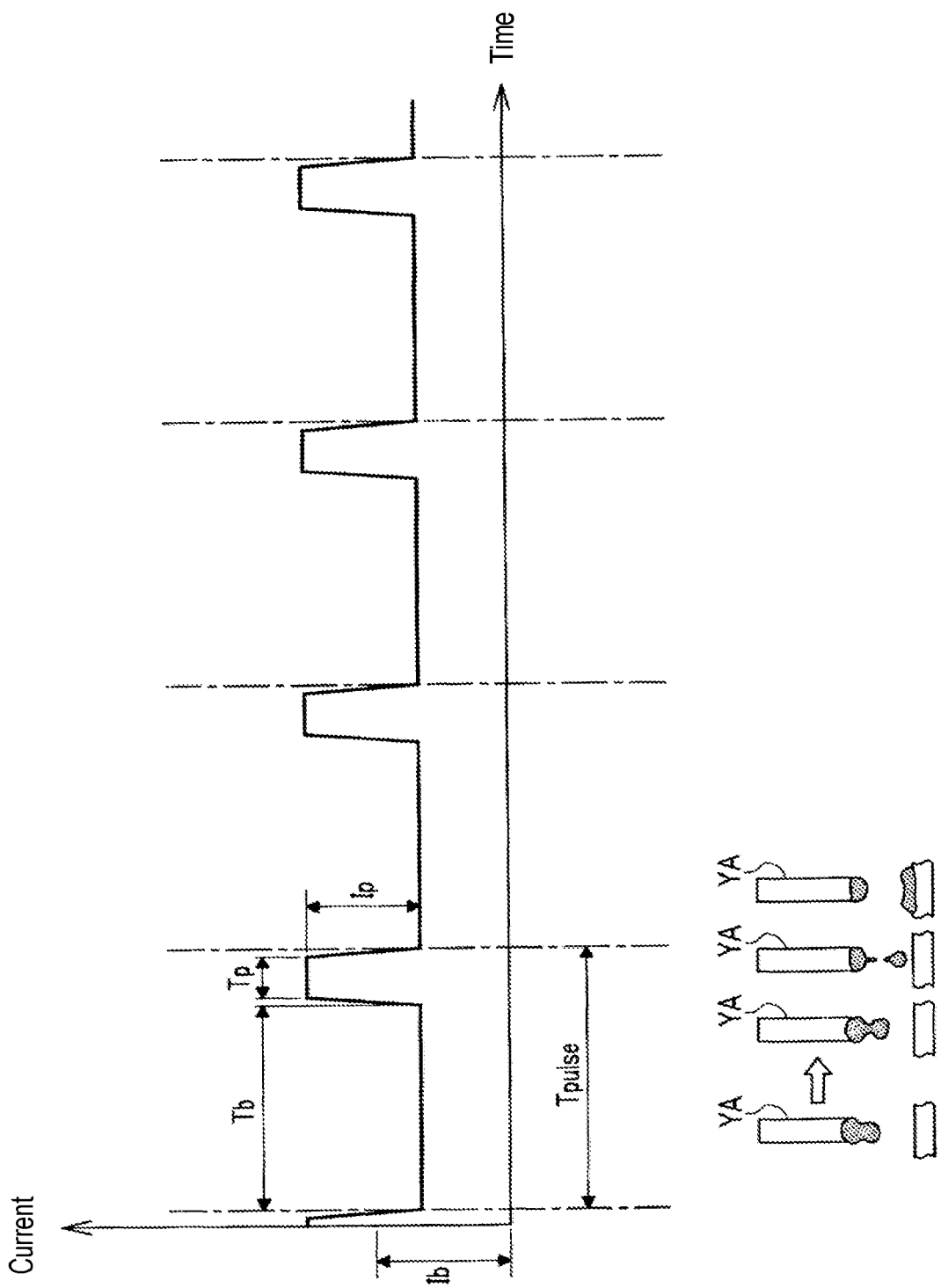
FIG. 2 is a schematic diagram schematically illustrating, corresponding to a graph, a relationship between a pulse peak time and a pulse peak current in the welding method according to the present invention.

FIG. 2 illustrates one example of the welding pulse of the present invention. Here, Ip stands for the pulse peak current, Ib stands for the pulse base current, Tp stands for the pulse peak time, Tb stands for the pulse base time, and Tpulse stands for the time of one pulse period.

In the case where the sheet thickness of the galvanized steel sheet W is 0.8 mm or more and less than 1.6 mm, the pulse peak time (Tp) is set to be 7% or more and less than 15% relative to the time of one period (Tpulse). In the case where the sheet thickness of the galvanized steel sheet W is 1.6 mm or more and less than 2.3 mm, the pulse peak time (Tp) is set to be 15% or more and less than 30% relative to the time of one period (Tpulse). In the case where the sheet thickness of the galvanized steel sheet W is 2.3 mm or more, the pulse peak time (Tp) is set to be 20% or more and 40% or less relative to the time of one period (Tpulse). Furthermore, when the sheet thickness of the galvanized steel sheet W is 2.6 mm, the pulse peak time (Tp) is set to be 20% or more and 40% or less relative to the time of one period (Tpulse).

If the ratio of the pulse peak time (Tp) for each sheet thickness above of the galvanized steel sheet W to the time of one period (Tpulse) falls below each lower limit value, since the pulse base time is too long, magnetic blow readily occurs, and pressing of the arc force against the molten pool is weakened by a lack of the arc force acting on the molten pool, as a result, zinc (Zn) vapor is taken in by the molten pool to generate blowholes (defects). If the ratio of the pulse peak time (Tp) for each sheet thickness of the galvanized steel sheet W to the time of one period (Tpulse) exceeds each upper limit value, a molten droplet cannot be stably transferred to the molten pool, and the amount of spatter increases. Accordingly, in the welding apparatus 1, within a predetermined sheet thickness of the galvanized steel sheet W, the pulse peak time is set to the above-described exact predetermined range (7% or more and less than 50%, preferably 7% or more and 40% or less) based on the sheet thickness, and the blowhole resistance is thereby enhanced. The range of the pulse peak time of more than 40% and less than 50% relative to the time of one period is applied to those where the sheet thickness is more than 3 mm and 4 mm or less.

Pulse welding is described below by referring to FIG. 2.

Figure 3:
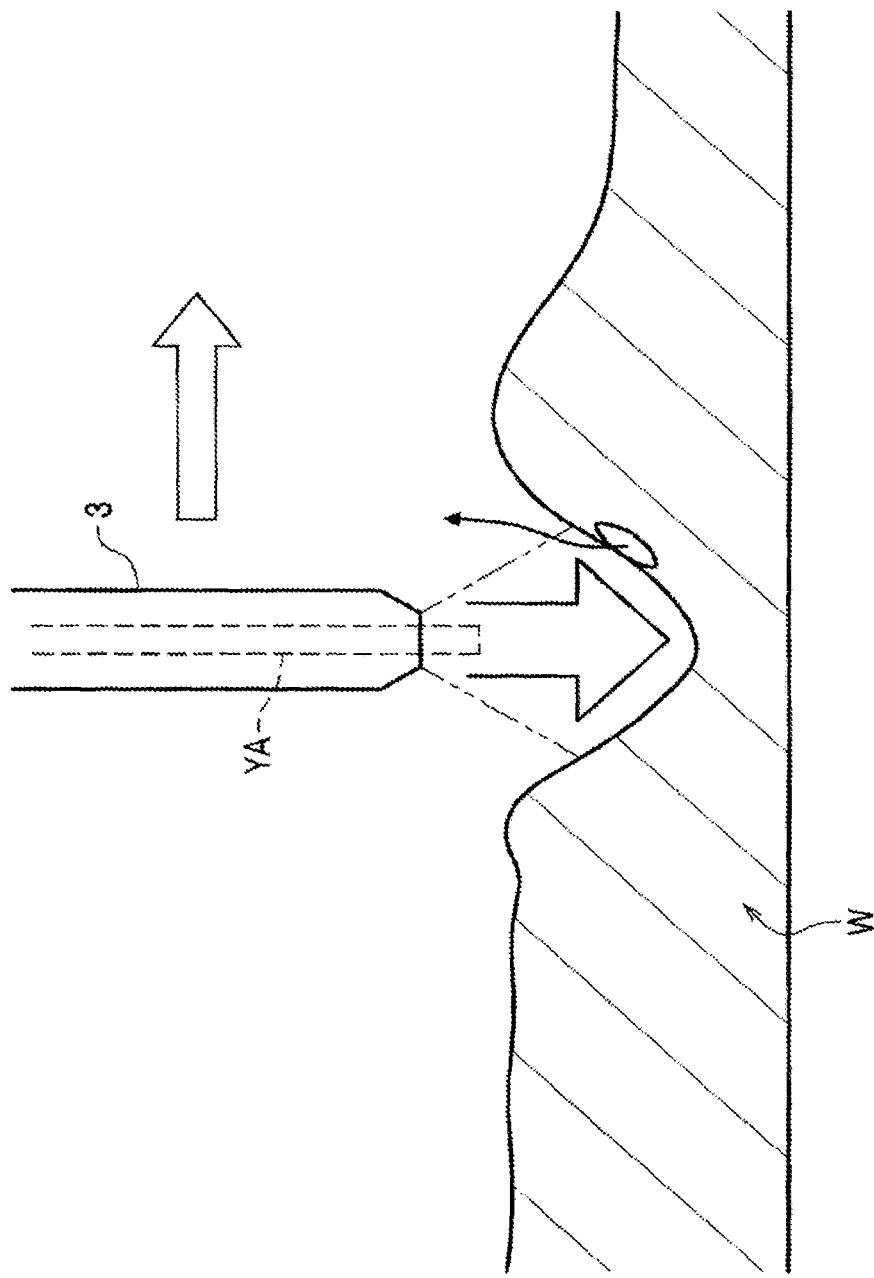
FIG. 3 is a cross-sectional diagram schematically illustrating the state where zinc vapor of a galvanized steel sheet is allowed to escape in the welding method according to the present invention.

The pulse peak time (Tp) is set to a predetermined time of one period and therefore, for example, in the pulse peak term, a pinching force acts on the entire molten droplet formed at the tip of a welding wire (for example, solid wire) YA. Out of the molten droplet formed at the tip of the welding wire YA, the molten droplet portion in the middle and lower parts is enveloped in arc, turned into a state to be separated by the pinching force. Further, in the peak falling-down term after the pulse peak time (Tp), it is separated as a molten droplet taking on a spherical shape from the molten droplet formed at the tip of the welding wire YA. Subsequently, in the base time (Tb) continuing from the pulse peak time (Tp), the separated molten droplet transfers to a molten pool. As illustrated in FIG. 3, an appropriate arc force acts on the molten pool due to these pulse peak time (Tp) and base time (Tb) set within one period, and strong pressing of the arc force against the molten pool is achieved, as a result, zinc (Zn) vapor is expelled and discharged from the molten pool, making generation of blowholes (defects) difficult. In FIG. 3, the position of the welding torch 3 is depicted as a vertical position, for the sake of clarity of the configuration.

<Wire Diameter>

Furthermore, it is preferable to set the pulse peak time based on the sheet thickness of the galvanized steel sheet W and along with that, set the wire diameter of the welding wire YA. Specifically, when the sheet thickness of the galvanized steel sheet W is 0.8 mm or more and less than 1.6 mm, a welding wire having a wire diameter in a range of 0.8 to 1.2 mm is used; when the sheet thickness is 1.6 mm or more and less than 2.3 mm, the wire diameter is set in a range of 1.0 to 1.4 mm; and when the sheet thickness is 2.3 mm or more, a welding wire having a wire diameter in a range of 1.2 to 1.6 mm is used.

The welding method of the present invention includes selecting an appropriate wire diameter depending on the thickness of a steel sheet that is a material to be welded. When the deposition amount is the same, a thicker welding wire tends to provide a high deposition current and a strong arc force. However, for example, in the case where the sheet thickness of the galvanized steel sheet W is as thin as 0.8 to 1.6 mm, burn-through is likely to occur and therefore, relatively thin wire diameter of, for example, from 0.8 to 1.2 mm is selected by placing priority on the gap resistance over the blowhole resistance. As the sheet thickness increases, burn-through is less likely to occur, and a thicker welding wire is selected by attaching weight to enhancement of the blowhole resistance. The blowhole resistance is improved by increasing the welding amount within the same welding time in this way. In addition, as the wire diameter is larger, the pinching force acting on the molten droplet formed at the wire tip decreases to cause unstable transfer of the molten droplet and therefore, the amount of spatter increases. In view of spatter, it is also necessary to select a wire having an appropriate thickness.

The component of the welding wire YA used in the present invention is not particularly limited. As for a solid wire that is the welding wire YA, a solid wire containing predetermined amounts of C, Si, Mn, P, S, Cr, etc., with the remainder being Fe and an unavoidable impurity, may be used, and examples thereof include YGW12, YGW16 and G49A2M16 each specified in JIS Z3312:2009. The unavoidable impurity is, for example, Cu, Mo, Al, Ti, Nb, Zr, or N. It is allowed for the welding wire YA to contain these elements to the extent of not hindering the effects of the present invention. The welding wire YA may also be a flux-cored wire, a metal-cored wire, etc. and is not limited to a solid wire.

<Shielding Gas>

The shielding gas for use in the present invention is an Ar mixed gas containing from 1 to 10 vol % of an oxidized gas. The oxidized gas means $CO_2$ or $O_2$. When 1 vol % or more of an oxidized gas is mixed in the shielding gas, a stable cathode spot is formed on the molten pool, and a stable arc is obtained.

In the case of less than 1 vol %, arc disturbance attributable to unstable behavior of the cathode spot on the molten pool is generated to cause an increase in the amount of spatter. On the other hand, since the oxidized gas in the shielding gas reacts with a deoxidizer in the molten metal to produce a slug and therefore, in order to reduce the amount of slug, the mixing ratio of the oxidized gas must be 10 vol % or less.

As to the amount of the oxidized gas in the Ar mixed gas, it is preferred that the lower limit thereof is 2 vol % and the upper limit thereof is 8 vol %, because each effect is more successfully obtained.

<Welding Speed>

In the present invention, the welding speed is specified to be 100 cm/min or less. If the welding speed is 100 cm/min or more, since the arc movement speed is fast, the solidification rate of the molten pool surpasses the desorption rate of zinc vapor, and it is likely that zinc vapor taken into the molten pool cannot fully escape and a blowhole defect is generated. From the viewpoint of suppressing generation of a blowhole defect, it is more preferable to set the upper limit of the welding speed to 75 cm/min.

If the welding speed is less than 30 cm/min, the amount of heat input increases, and burn-through of the steel sheet is likely to occur. Accordingly, the lower limit of the welding speed is preferably set to 30 cm/min.

<Ratio of Estimated Voltage to Arc Voltage>

Furthermore, in the welding method according to the present invention, it is more preferred that the value of Y/X represented by the ratio of relational expression (X) of the following Formula 1 to the arc voltage (Y) of Formula 2 is set to fall in the range of 0.75 to 1.1.

[Math. 1]

$$X = \left(\left[\frac{[VOL \% \ CO_2]}{5} + 21\right]\right) \times \left(\left[\frac{[average \ current] - 60}{280}\right]\right) + 14 \quad \text{Formula 1}$$

$$Y = [welding \ voltage] \quad \text{Formula 2}$$

$$0.75 \leq Y/X \leq 1.1 \quad \text{Formula 3}$$

More specifically, it has been found that in the pulse welding, when the ratio of the value of relational expression (X) including vol % of oxidized gas relative to Ar gas of the shielding gas and an average current to the arc voltage (Y) satisfies the predetermined range (from 0.75 to 1.1), a better weld metal is obtained. Formula 1 has been empirically derived by repeating experiments based on finding from experience that the concentration of oxidized gas in the shielding gas, the current value, and the voltage value consumed in welding (arc) are correlated. The present inventors suppose that relational expression (X) indicates the voltage value contributing to welding.

Figure 4:
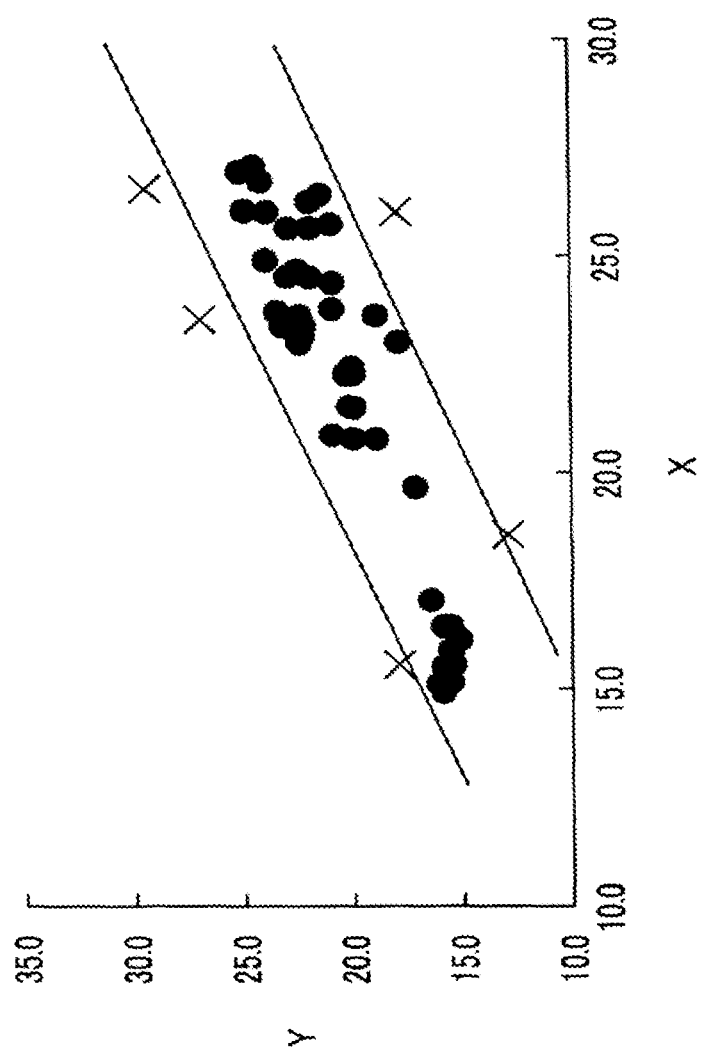
FIG. 4 is a graph diagram illustrating a ratio of an estimated voltage to an arc voltage in the welding method according to the present invention.

With respect to the above-described correlation, that the ratio represented by Y/X falls in the predetermined range (from 0.75 to 1.1) is a welding condition for more enhancing the blowhole resistance and reducing the spatter, in combination with other welding conditions discussed earlier. FIG. 4 represents, in performing pulse welding, the value of Y on the ordinate and the value of X on the abscissa. It can be understood that the case where the ratio represented by Y/X falls in the predetermined range (from 0.75 to 1.1) which is indicated by two lines in the graph and presents appropriate welding conditions is preferable. If the value of the ratio represented by Y/X is a value exceeding 1.1, the blowhole resistance deteriorates (the arc length becomes too long, and the weld part burns through). If the ratio represented by Y/X is a value of less than 0.75, the spatter deteriorates (the electrodeposition coatability deteriorates). Accordingly, the value of the ratio represented by Y/X is set to fall in the range of 0.75 to 1.1, so that blowhole resistance is more excellent, and spatter is reduced and thereby the electrodeposition coatability can be further enhanced.

EXAMPLES

With respect to the production method of a galvanized steel sheet according to the present invention, for example, the relationship between the sheet thickness of the galvanized steel sheet and the pulse peak ratio is described below by referring to Comparative Examples and Examples.

Here, the conditions as to the shielding gas of an Ar mixed gas containing $CO_2$ in a predetermined range, the welding speed, the kind of the welding wire, the wire diameter, the sheet thickness, the coating weight, the pulse conditions, the welding current, the arc voltage, and the ratio of Y/X were set to obtain experimental data, and the blowhole resistance, the amount of slug and the amount of spatter were judged. The galvanized steel sheet evaluated in this Example is described by assigning Nos. 1 to 61 to the specimens.

Evaluation Method and Welding Method

By using 440 MPa-class galvanized steel sheets of 0.8 mm, 1.2 mm, 1.4 mm, 1.6 mm, 2.0 mm, 2.3 mm, and 2.6 mm, horizontal lap fillet welding of a steel sheet having a width of 70 mm and a length of 200 mm was performed in welding length of 180 mm. The welding current, voltage, welding speed, and wire diameter were changed for every sheet thickness.

The blowhole resistance was evaluated by the areal amount of blowhole defect by performing an RT test of the specimen after welding, and binarizing an X-ray transmission photograph. Horizontal lap fillet welding was conducted by setting the welding length to 180 mm, and the rating was "C" when the blowhole defect area was 80 $mm^2$ or more, "B" when the blowhole defect area was 60 $mm^2$ or more and less than 80 $mm^2$, and "A" when the blowhole defect area was less than 60 $mm^2$. As for the amount of slug, the specimen immediately after welding was observed with an eye, and the rating was "C" when a slug was produced in both the bead center portion and the bead toe portion, "B" when a slug was produced only in the bead toe portion, and "A" when a slug was produced only in the bead center portion. As for the amount of spatter, check with eyes was performed after welding, and the rating was "C" when the number of large spatters of 1 mm or more attached to the steel sheet was 5 or more, "B" when it was from 1 to 4, and "A" when a large spatter of 1 mm or more was not attached at all.

The specimen was judged as bad (Comparative Example) when "C" was assigned to any item in three items of blowhole resistance, amount of slug and amount of spatter, and judged as fair (Example) when either "A" or "B" was assigned.

TABLE 1

| | Shielding Gas | | Welding Speed | Steel Sheet | | Welding Wire | Pulse Condition | | | Parameters | | | Evaluation | | |
|---|---|---|---|---|---|---|---|---|---|---|---|---|---|---|---|
| | | Oxidized Gas Ratio | | Sheet Thickness | Coating Weight | Wire Diameter | Peak Ratio | Average Current | Arc Voltage | | | Ratio | Blowhole | Slug | Spatter |
| No. | Gas | | Welding Speed | | | | | | | X | Y | Y/X | Resistance | Amount | Amount |
| 1 | Ar + 5% $CO_2$ | 5% | 75 | 0.8 | 45 | 0.9 | 8.0 | 72 | 16.0 | 14.9 | 16.0 | 1.07 | A | A | A |
| 2 | Ar + 5% $CO_2$ | 5% | 75 | 0.8 | 45 | 0.9 | 7.4 | 73 | 16.0 | 15.0 | 16.0 | 1.07 | A | A | A |
| 3 | Ar + 5% $CO_2$ | 5% | 75 | 0.8 | 45 | 0.9 | 6.1 | 74 | 16.2 | 15.1 | 16.2 | 1.08 | C | A | A |
| 4 | Ar + 5% $CO_2$ | 5% | 60 | 1.2 | 45 | 0.9 | 6.5 | 75 | 15.7 | 15.1 | 15.7 | 1.04 | C | A | A |
| 5 | Ar + 5% $CO_2$ | 5% | 60 | 1.2 | 45 | 0.9 | 6.0 | 85 | 15.5 | 15.9 | 15.5 | 0.98 | C | A | A |
| 6 | Ar + 5% $CO_2$ | 5% | 60 | 1.2 | 45 | 0.9 | 7.9 | 80 | 15.7 | 15.5 | 15.7 | 1.01 | A | A | A |
| 7 | Ar + 5% $CO_2$ | 5% | 60 | 1.2 | 45 | 0.9 | 7.9 | 88 | 15.2 | 16.1 | 15.2 | 0.94 | A | A | A |
| 8 | Ar + 5% $CO_2$ | 5% | 60 | 1.2 | 45 | 0.9 | 9.4 | 80 | 15.9 | 15.5 | 15.9 | 1.03 | A | A | A |
| 9 | Ar + 5% $CO_2$ | 5% | 60 | 1.2 | 45 | 0.9 | 8.6 | 92 | 15.7 | 16.4 | 15.7 | 0.96 | A | A | A |
| 10 | Ar + 5% $CO_2$ | 5% | 60 | 1.2 | 45 | 0.9 | 15.3 | 92 | 16.0 | 16.4 | 16.0 | 0.98 | A | A | C |
| 11 | Ar + 5% $CO_2$ | 5% | 60 | 1.2 | 45 | 0.9 | 13.2 | 85 | 15.7 | 15.9 | 15.7 | 0.99 | A | A | A |
| 12 | Ar + 5% $CO_2$ | 5% | 100 | 1.6 | 45 | 1.0 | 25.6 | 180 | 18.0 | 23.0 | 18.0 | 0.78 | B | A | A |
| 13 | Ar + 5% $CO_2$ | 5% | 60 | 1.6 | 45 | 1.0 | 21.1 | 190 | 21.0 | 23.8 | 21.0 | 0.88 | A | A | A |
| 14 | Ar + 5% $CO_2$ | 5% | 60 | 1.6 | 45 | 1.0 | 16.8 | 200 | 23.0 | 24.5 | 23.0 | 0.94 | A | A | A |
| 15 | Ar + 5% $CO_2$ | 5% | 60 | 1.6 | 45 | 1.0 | 18.5 | 150 | 20.0 | 20.8 | 20.0 | 0.96 | A | A | A |
| 16 | Ar + 5% $CO_2$ | 5% | 60 | 1.6 | 45 | 1.0 | 14.2 | 151 | 21.0 | 20.8 | 21.0 | 1.01 | C | A | A |
| 17 | Ar + 5% $CO_2$ | 5% | 60 | 2.0 | 45 | 1.0 | 16.8 | 200 | 22.0 | 24.5 | 22.0 | 0.90 | A | A | A |
| 18 | Ar + 5% $CO_2$ | 5% | 60 | 2.0 | 45 | 1.0 | 18.5 | 150 | 19.0 | 20.8 | 19.0 | 0.92 | A | A | A |
| 19 | Ar + 5% $CO_2$ | 5% | 60 | 2.0 | 45 | 1.0 | 14.2 | 160 | 20.2 | 21.5 | 20.2 | 0.94 | C | A | A |
| 20 | Ar + 5% $CO_2$ | 5% | 60 | 2.0 | 45 | 1.0 | 31.7 | 160 | 20.0 | 21.5 | 20.0 | 0.93 | A | A | C |
| 21 | Ar + 5% $CO_2$ | 5% | 60 | 2.3 | 45 | 1.2 | 30.0 | 215 | 23.0 | 25.6 | 23.0 | 0.90 | A | A | A |
| 22 | Ar + 5% $CO_2$ | 5% | 60 | 2.3 | 45 | 1.2 | 26.3 | 216 | 21.0 | 25.7 | 21.0 | 0.82 | A | A | A |
| 23 | Ar + 5% $CO_2$ | 5% | 60 | 2.3 | 45 | 1.2 | 23.1 | 215 | 23.0 | 25.6 | 23.0 | 0.90 | A | A | A |
| 24 | Ar + 5% $CO_2$ | 5% | 60 | 2.3 | 45 | 1.2 | 18.5 | 220 | 24.0 | 26.0 | 24.0 | 0.92 | C | A | A |
| 25 | Ar + 5% $CO_2$ | 5% | 100 | 2.6 | 45 | 1.2 | 30.0 | 215 | 22.0 | 25.6 | 22.0 | 0.86 | B | A | A |
| 26 | Ar + 5% $CO_2$ | 5% | 60 | 2.6 | 45 | 1.2 | 26.3 | 220 | 25.0 | 26.0 | 25.0 | 0.96 | A | A | A |
| 27 | Ar + 5% $CO_2$ | 5% | 60 | 2.6 | 45 | 1.2 | 27.3 | 205 | 24.0 | 24.9 | 24.0 | 0.96 | A | A | A |
| 28 | Ar + 5% $CO_2$ | 5% | 60 | 2.6 | 45 | 1.2 | 41.7 | 198 | 21.0 | 24.4 | 21.0 | 0.86 | A | A | C |
| 29 | 100% Ar | 0% | 60 | 1.6 | 45 | 1.0 | 25.6 | 180 | 22.5 | 23.0 | 22.5 | 0.98 | A | A | C |
| 30 | Ar + 1% $CO_2$ | 1% | 60 | 1.6 | 45 | 1.0 | 25.6 | 181 | 22.3 | 23.1 | 22.3 | 0.97 | A | A | A |

TABLE 2

| | Shielding Gas | | Welding Speed | Steel Sheet | | Welding Wire | Pulse Condition | | | Parameters | | | Evaluation | | |
|---|---|---|---|---|---|---|---|---|---|---|---|---|---|---|---|
| | | Oxidized Gas Ratio | | Sheet Thickness | Coating Weight | Wire Diameter | Peak Ratio | Average Current | Arc Voltage | | | Ratio | Blowhole | Slug | Spatter |
| No. | Gas | | Welding Speed | | | | | | | X | Y | Y/X | Resistance | Amount | Amount |
| 31 | Ar + 10% $CO_2$ | 10% | 60 | 1.6 | 45 | 1.0 | 25.6 | 182 | 22.5 | 23.2 | 22.5 | 0.97 | A | A | A |
| 32 | Ar + 10% $O_2$ | 10% | 60 | 1.6 | 45 | 1.0 | 25.6 | 183 | 22.4 | 23.2 | 22.4 | 0.96 | A | B | A |
| 33 | Ar + 12% $CO_2$ | 12% | 60 | 1.6 | 45 | 1.0 | 25.6 | 183 | 22.4 | 23.2 | 22.4 | 0.96 | A | C | A |
| 34 | Ar + 8% $CO_2$ | 8% | 60 | 1.6 | 45 | 1.0 | 25.6 | 183 | 22.4 | 23.2 | 22.4 | 0.96 | A | A | A |
| 35 | Ar + 5% $CO_2$ | 5% | 40 | 1.6 | 45 | 1.2 | 25.6 | 185 | 22.6 | 23.4 | 22.6 | 0.97 | A | A | A |
| 36 | Ar + 5% $CO_2$ | 5% | 60 | 1.6 | 45 | 1.2 | 25.6 | 186 | 22.5 | 23.5 | 22.5 | 0.96 | A | A | A |
| 37 | Ar + 5% $CO_2$ | 5% | 80 | 1.6 | 45 | 1.2 | 25.6 | 184 | 22.4 | 23.3 | 22.4 | 0.96 | B | A | A |
| 38 | Ar + 5% $CO_2$ | 5% | 110 | 1.6 | 45 | 1.2 | 25.6 | 188 | 22.5 | 23.6 | 22.5 | 0.95 | C | A | A |
| 39 | Ar + 5% $CO_2$ | 5% | 60 | 1.6 | 60 | 1.2 | 25.6 | 188 | 22.5 | 23.6 | 22.5 | 0.95 | A | A | A |
| 40 | Ar + 5% $CO_2$ | 5% | 60 | 1.6 | 90 | 1.2 | 25.6 | 185 | 23.2 | 23.4 | 23.2 | 0.99 | A | A | A |
| 41 | Ar + 5% $CO_2$ | 5% | 60 | 1.6 | 120 | 1.2 | 25.6 | 187 | 23.4 | 23.5 | 23.4 | 0.99 | B | A | A |
| 42 | Ar + 5% $CO_2$ | 5% | 60 | 1.6 | 45 | 1.2 | 25.6 | 189 | 23.5 | 23.7 | 23.5 | 0.99 | A | A | A |
| 43 | Ar + 5% $CO_2$ | 5% | 60 | 1.6 | 45 | 1.2 | 25.6 | 187 | 22.5 | 23.5 | 22.5 | 0.96 | A | A | A |
| 44 | Ar + 5% $CO_2$ | 5% | 60 | 1.6 | 45 | 1.2 | 25.6 | 188 | 22.5 | 23.6 | 22.5 | 0.95 | A | A | A |
| 45 | Ar + 5% $CO_2$ | 5% | 60 | 1.6 | 45 | 1.2 | 25.6 | 188 | 19.0 | 23.6 | 19.0 | 0.80 | A | A | A |
| 46 | Ar + 5% $CO_2$ | 5% | 60 | 0.8 | 45 | 0.8 | 7.9 | 80 | 15.5 | 15.5 | 15.5 | 1.00 | A | A | A |
| 47 | Ar + 5% $CO_2$ | 5% | 60 | 0.8 | 45 | 1.0 | 13.0 | 100 | 16.5 | 17.0 | 16.5 | 0.97 | A | A | A |
| 48 | Ar + 5% $CO_2$ | 5% | 60 | 1.4 | 45 | 0.8 | 10.8 | 135 | 17.2 | 19.6 | 17.2 | 0.88 | A | A | A |
| 49 | Ar + 5% $CO_2$ | 5% | 60 | 1.4 | 45 | 1.4 | 10.8 | 170 | 20.4 | 22.3 | 20.4 | 0.92 | A | A | B |
| 50 | Ar + 5% $CO_2$ | 5% | 60 | 1.6 | 45 | 0.8 | 22.2 | 170 | 20.1 | 22.3 | 20.1 | 0.90 | B | A | A |
| 51 | Ar + 5% $CO_2$ | 5% | 60 | 1.6 | 45 | 1.4 | 22.2 | 172 | 20.1 | 22.4 | 20.1 | 0.90 | A | A | A |
| 52 | Ar + 5% $CO_2$ | 5% | 60 | 2.0 | 45 | 1.0 | 28.1 | 202 | 22.6 | 24.7 | 22.6 | 0.92 | A | A | A |
| 53 | Ar + 5% $CO_2$ | 5% | 60 | 2.0 | 45 | 1.6 | 29.4 | 229 | 24.2 | 26.7 | 24.2 | 0.91 | A | A | B |
| 54 | Ar + 5% $CO_2$ | 5% | 60 | 2.3 | 45 | 1.6 | 29.4 | 234 | 24.5 | 27.1 | 24.5 | 0.91 | A | A | A |

TABLE 2-continued

| No. | Shielding Gas Gas | Oxidized Gas Ratio | Welding Speed | Steel Sheet Thickness | Steel Sheet Coating Weight | Welding Wire Wire Diameter | Pulse Condition Peak Ratio | Current Average Current | Voltage Arc Voltage | Parameters X | Parameters Y | Parameters Ratio Y/X | Evaluation Blowhole Resistance | Evaluation Slug Amount | Evaluation Spatter Amount |
|---|---|---|---|---|---|---|---|---|---|---|---|---|---|---|---|
| 55 | Ar + 5% CO$_2$ | 5% | 60 | 2.6 | 45 | 1.0 | 32.0 | 225 | 21.5 | 26.4 | 21.5 | 0.81 | B | A | A |
| 56 | Ar + 5% CO$_2$ | 5% | 60 | 2.6 | 45 | 1.6 | 29.4 | 232 | 25.2 | 26.9 | 25.2 | 0.94 | A | A | A |
| 57 | Ar + 5% CO$_2$ | 5% | 60 | 1.6 | 45 | 1.6 | 22.2 | 170 | 27 | 23.5 | 27.0 | 1.15 | B | A | A |
| 58 | Ar + 5% CO$_2$ | 5% | 60 | 2.0 | 45 | 1.6 | 28.1 | 210 | 29.5 | 26.5 | 29.5 | 1.11 | B | A | A |
| 59 | Ar + 5% CO$_2$ | 5% | 60 | 2.3 | 45 | 1.6 | 30.8 | 220 | 18 | 26.0 | 18.0 | 0.69 | A | A | B |
| 60 | Ar + 5% CO$_2$ | 5% | 61 | 1.6 | 45 | 1.6 | 15.7 | 120 | 13 | 18.5 | 13.0 | 0.70 | A | A | B |
| 61 | Ar + 5% CO$_2$ | 5% | 62 | 1.4 | 45 | 1.6 | 12.9 | 80 | 18 | 15.5 | 18.0 | 1.16 | B | A | A |

It is seen that in specimen Nos. 1, 2, 6 to 9, 11 to 15, 17, 18, 21 to 23, 25 to 27, 30 to 32, 34 to 37, and 39 to 61 where the pulse peak time within a predetermined range in response to the sheet thickness, the welding speed, and vol % of the shielding gas were set to ranges satisfying the requirements of the present invention, the blowhole resistance is excellent, the amount of slug is appropriate, and the amount of spatter is small.

On the other hand, it is seen that in specimen Nos. 3 to 5, 16, 19, and 24 where the pulse peak time deviated below the predetermined range, evaluation of the blowhole resistance is bad. On the other hand, in specimen Nos. 10, 20 and 28 where the pulse peak time deviated above the predetermined range, evaluation of the amount of spatter is bad. In specimen Nos. 29 and 33 where the ratio of the oxidized gas in the shielding gas deviated from the predetermined range, evaluations of the amount of slug and the amount of spatter are bad. Furthermore, in specimen No. 38 where the welding speed deviated from the predetermined range, evaluation of the blowhole resistance is bad. In specimen No. 41 where the coating weight was larger than the predetermined range, zinc vapor remains without being fully discharged from the molten metal, and evaluation of the blowhole resistance is not bad but is inferior.

In specimen Nos. 57 to 61, for example, the welding speed, the shielding gas condition, and the ratio of the pulse peak time to one period satisfy the predetermined ranges, but the parameter Y/X deviates from the predetermined range. It is understood that in those, the blowhole resistance and the amount of spatter are not evaluated as bad but are inferior compared with those where the parameter Y/X is in the predetermined range.

The present invention is described in detail with reference to specific embodiments, but it is apparent for those skilled in the art that various changes or modifications can be added without departing from the spirit and the scope of the present invention.

This application is based upon Japanese Patent Application (Application No. 2015-147842), filed on Jul. 27, 2015, the content of which is incorporated herein by reference.

INDUSTRIAL APPLICABILITY

The present invention is useful for welding of a galvanized steel sheet used in automotive parts, etc. and can enhance the electrodeposition coatability and blowhole resistance.

DESCRIPTION OF REFERENCE NUMERALS AND SIGNS

1 Welding apparatus
2 Robot arm
3 Welding torch
10 Robot controller
20 Teaching device
Bg Gas cylinder
G Welding power source
Sd Advancing mechanism
W Galvanized steel sheet
YA Welding wire

The invention claimed is:

1. A method for welding a galvanized steel sheet, comprising utilizing a pulse welding of repeatedly applying a pulse peak current and a base current, setting a welding speed to 100 cm/min or less, and using a shielding gas in which 1 vol % or more and 10 vol % or less of at least either one of $CO_2$ and $O_2$ is added to Ar, wherein:
   the pulse peak current has a pulse peak time being in a range of 7% or more and less than 50% of one period depending on a sheet thickness of the galvanized steel sheet;
   in a case where the sheet thickness is 0.8 mm or more and less than 1.6 mm, the pulse peak time has a lower limit value of 7% or more of the one period and the pulse peak time has an upper limit value of less than 15% of the one period;
   in a case where the sheet thickness is 1.6 mm or more and less than 2.3 mm, the pulse peak time has a lower limit value of 15% or more of the one period and the pulse peak time has an upper limit value of less than 30% of the one period; and
   in a case where the sheet thickness is 2.3 mm or more and less than 3 mm, the pulse peak time has a lower limit value of 20% or more of the one period and the pulse peak time has an upper limit value of 40% or less of the one period.

2. The welding method of a galvanized steel sheet according to claim 1, wherein the shielding gas comprises 8 vol % or less of $CO_2$ or $O_2$.

3. The welding method of a galvanized steel sheet according to claim 2, wherein:
   in a case where the sheet thickness is 0.8 mm or more and less than 1.6 mm, a welding wire diameter is 0.8 mm or more and 1.2 mm or less;

in a case where the sheet thickness is 1.6 mm or more and less than 2.3 mm, a welding wire diameter is 1.0 mm or more and 1.4 mm or less; and in a case where the sheet thickness is 2.3 mm or more, a welding wire diameter is 1.2 mm or more and 1.6 mm or less.

4. The welding method of a galvanized steel sheet according to claim 1, wherein:

in a case where the sheet thickness is 0.8 mm or more and less than 1.6 mm, a welding wire diameter is 0.8 mm or more and 1.2 mm or less;

in a case where the sheet thickness is 1.6 mm or more and less than 2.3 mm, a welding wire diameter is 1.0 mm or more and 1.4 mm or less; and in a case where the sheet thickness is 2.3 mm or more, a welding wire diameter is 1.2 mm or more and 1.6 mm or less.

5. The welding method of a galvanized steel sheet according to claim 1, wherein the welding speed of the pulse welding is 75 cm/min or less.

6. The welding method of a galvanized steel sheet according to claim 1, wherein the galvanized steel sheet has a coating weight of 90 g/m² or less on one surface.

7. The welding method of a galvanized steel sheet according to claim 1, performed under a welding condition where Y/X satisfies 0.75≤Y/X≤1.1, wherein in the pulse welding:

$$X = \left(\left[\frac{[VOL\ \%\ CO_2]}{5} + 21\right]\right) \times \left(\left[\frac{[\text{average current}] - 60}{280}\right]\right) + 14, \quad \text{Formula 1}$$

and $$Y = [\text{welding voltage}]. \quad \text{Formula 2}$$

* * * * *